United States Patent [19]

Barnsbee

[11] 4,194,926
[45] Mar. 25, 1980

[54] APPARATUS AND METHOD FOR SELECTIVELY RECLAIMING PARTS FROM FILM CARTRIDGES

[75] Inventor: Clive D. Barnsbee, Rochester, N.Y.

[73] Assignee: Eastman Kodak Company, Rochester, N.Y.

[21] Appl. No.: 943,509

[22] Filed: Sep. 18, 1978

Related U.S. Application Data

[60] Division of Ser. No. 844,950, Oct. 25, 1977, abandoned, which is a continuation of Ser. No. 701,925, Jul. 2, 1976, abandoned.

[51] Int. Cl.$^2$ .............................................. B08B 3/10
[52] U.S. Cl. ........................................ 134/29; 134/35; 209/11; 209/173
[58] Field of Search .................... 209/10, 11, 172, 173, 209/3; 134/37, 35, 25 R, 104, 105, 108, 67, 29; 241/20, 24

[56] References Cited

U.S. PATENT DOCUMENTS

| 675,833 | 6/1901 | Jones ................................. 209/11 X |
| 2,764,289 | 9/1956 | Scheid ................................ 209/173 |
| 3,544,369 | 1/1970 | Keogh ............................... 134/25 R |
| 3,868,960 | 3/1975 | Cove et al. ....................... 134/104 X |
| 3,968,572 | 7/1976 | Stuchberry ........................ 209/11 X |

FOREIGN PATENT DOCUMENTS 2355744  5/1974  Fed. Rep. of Germany ........... 209/173

Primary Examiner—Ralph J. Hill
Attorney, Agent, or Firm—Steve W. Gremban

[57] ABSTRACT

Plastic film cartridges generally comprise a variety of component parts plus a label affixed by adhesive to the cartridge housing. The cartridge housing (a plastic) is recyclable when the label and adhesive are removed and the housing is separated from the other non-compatible plastic and non-plastic cartridge components. In accordance with the invention, multi-stage reclaiming apparatus and method is disclosed wherein film cartridges are first rough chopped to provide physical separation of the cartridge components. The cartridge housing pieces are separated from other cartridge components on the basis of differences in specific gravity in a series of specific gravity separation tanks. To remove the labels and adhesive from the housing pieces, a separation tank contains a detergent solution capable of assisting in dissolving the adhesive. The tank is provided with a group of heating elements to cause the detergent solution to boil in the immediate vicinity thereof. As housing pieces travel past the heating elements they are rolled around, swirled and submerged and each housing piece with a label portion adhered thereto is exposed to the boiling detergent solution. The adhesive is thus dissolved and the label portions are driven off the housing pieces.

10 Claims, 2 Drawing Figures

APPARATUS AND METHOD FOR SELECTIVELY RECLAIMING PARTS FROM FILM CARTRIDGES

This is a division of application Ser. No. 844,950, filed Oct. 25, 1977 (now abandoned), which is a continuation of Ser. No. 701,925, filed July 2, 1976 (now abandoned).

BACKGROUND OF THE INVENTION

1. Field of the Invention

The present invention relates to apparatus for separating recyclable plastic material from waste material, and in particular for separating and reclaiming certain plastic parts of film cartridges.

2. Description Relative to the Prior Art

It is generally known to separate materials based upon a difference in their specific gravity. U.S. Pat. No. 2,894,629 discloses a method for separating mixtures of divided solid materials comprising a heavy component and a light component. The solid material to be separated is fed to a tank containing a liquid having a specific gravity intermediate that of the light component and heavy component. The heavy component, therefore, sinks and can be recovered from the bottom of the container while the light component floats and can be recovered from the upper portion of the liquid. Such a method assumes the component parts of the material to be separated are physically divided as, for example, are coal particles which are to be separated from other mineral elements dispersed therein.

Examples are common, however, where the separation process is complicated by the fact that the component parts of the material to be separated are not physically divided and thus must be divided before attempting separation. U.S. Pat. No. 3,516,841 discloses apparatus for separating the metallic components from the plastic components in a metallic-plastic laminato structure. The metallic-plastic laminate structure is first chopped into relatively minuto segments and then subjected to a shearing and grinding operation to further reduce the size of the segments and to free the metallic component from the plastic component. This metallic and plastic particulate mixture is fed to a separation tank (containing a liquid having a specific gravity in between that of the metal and plastic) wherein gentle agitation is provided to facilitate physical separation of the metallic and plastic components. The mixture then passes to a settling portion of the separation tank wherein the heavier component (usually the metallic component) sinks and the lighter component (usually the plastic component) floats.

Another method for separating components from a structure wherein the components are not originally physically divided is disclosed in U.S. Pat. No. 3,892,563. According to the disclosure, whole or shredded lead-acid batteries plus certain chemicals are fed into a rotating drum separator containing a plurality of grinding balls. Agitation of the mixture breaks up and degrades the battery fragments forming a heavy-medium suspension on which organic battery fragments (the battery case and the individual cell separators) float. The suspension constantly overflows from one end of the rotating drum thereby carrying the organic components to a trommel from which the organic components can be retrieved.

It is apparent that the method of separation of the components parts of a structure, material, article, etc. depends in large part upon the particular article to be separated. For example, the lead-acid battery separator described in U.S. Pat. No. 3,892,563 probably would not provide effective or efficient separation of components of a metallic-plastic laminate structure; nor would the metallic-plastic laminate structure separator disclosed in U.S. Pat. No. 3,516,841 be particularly suitable for the separation of components of a lead-acid battery. The present invention is directed towards the separation of the component parts of a film cartridge. The separation process depends in large part upon particular properties of the film cartridge itself.

Referring to FIG. 1, a super 8 movie film cartridge is shown comprising a polystyrene cartridge housing 10, a polycarbonate disc element 12, a butyrate roller post 14 and a brass leaf spring 16 which spring biases a polycarbonate pressure pad 18. Affixed by an adhesive to the cartridge housing 10 is a paper label 20. Polystyrene from the plastic housing 10 is reusable if it can be separated from the other components. Since the specific gravity of polystyrene is about 1.06 while the specific gravity of polycarbonate, butyrate and brass is about 1.25, 1.20 and 8.6 respectively, separation of the polystyrene component from the other components on the basis of differences in specific gravity seems to be an attractive approach. For example, one might break up the film cartridge to physically separate the various components and feed this mixture to a container holding a liquid with a specific gravity of about 1.1. The pieces of the polystyrene housing 10 should float while the remaining components sink, thereby allowing the polystyrene to be skimmed off the top of the liquid. However, there are several problems which stand in the way of such a technique. One of the problems is the labels. Being affixed to the plastic housing with an adhesive, the labels are not physically loosened from the housing by chopping up the film cartridge. Unless steps are taken to ensure otherwise, the labels remain affixed to the pieces of the plastic housing throughout the separation process thereby contaminating what would otherwise be recyclable polystyrene. Further, not only the labels themselves but also the adhesive used to bond the labels to the plastic housing must be removed. The general problem of removing labels and adhesive from plastic is recognized in "Processing the Plastics from Urban Refuse" by J. L. Holman et al., Bureau of Mines Solid Waste Research Program, Technical Progress Report 50, February, 1972, U.S. Department of the Interior, wherein it is stated "Labels, and the adhesives with which they are applied are difficult to remove, and remnants may be deleterious to subsequent use of the plastics . . . In table 5, the results of 1-hour scrubbing on samples . . . are shown in terms of the percentage of pieces still showing contamination". The "table 5" referred to indicates that after an hour of scrubbing about 5% of the pieces still have portions of labels or adhesive affixed thereto. Even though it is recognized that the removal of labels and adhesive from the plastic housing 10 is not easy, such removal must be accomplished effectively and at a reasonable cost if the polystyrene from the housing is to be reused. In this regard, it is known in the art to "laundry" cartridges by running them through a clothes-type washer in an effort to remove labels. It is further known to place the cartridges in an open vat of heated water. Although these methods have had varied degrees of success in removing labels from cartridges, most of them are very time consuming and expensive.

SUMMARY OF THE INVENTION

In accordance with the invention, multi-stage reclaiming apparatus and method is disclosed wherein film cartridges are first rough chopped to provide physical separation of the cartridge components. The cartridge housing pieces are separated from other cartridge components on the basis of differences in specific gravity in a series of specific gravity separation tanks. To remove the labels and adhesive from the housing pieces, a separation tank contains a detergent solution for assisting in the dissolving of the adhesive. The tank is provided with a group of heating elements to cause the detergent solution to boil in the immediate vicinity thereof. As housing pieces travel past the heating elements they are rolled around, swirled and submerged and each housing piece with a label portion adhered thereto is exposed to the boiling detergent solution. The adhesive is thus dissolved and the label portions are driven off the housing pieces. In more specific embodiments of the invention, means are provided for heating the fluid almost to its boiling temperature and causing the fluid to flow through the tank. The heating elements comprise perforated tubes through which steam is introduced into the fluid or electrical heater rods for causing the fluid in the vicinity thereof to boil.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENTS

Because fluid handling apparatus are well known, the present description will be directed to elements forming part of, or cooperating more directly with, apparatus and method in accordance with the present invention. Elements of fluid handling apparatus not specifically shown or described should be understood to be selectable from those known in the art.

The present invention relates to apparatus and method for separating components of a film cartridge on the basis of differences in their specific gravity. One example of a film cartridge, a super 8 movie film cartridge, has been previously described in connection with FIG. 1. For purposes of illustration, the preferred embodiments of the invention presented below will be described in relation to a film cartridge generally of the type shown in FIG. 1. It will be apparent to those skilled in the art, however, that the present invention is applicable to a variety of types of film cartridges, for example 110 and 126 film size cartridges, and is not limited to only super 8 movie film cartridges.

Figure 1:
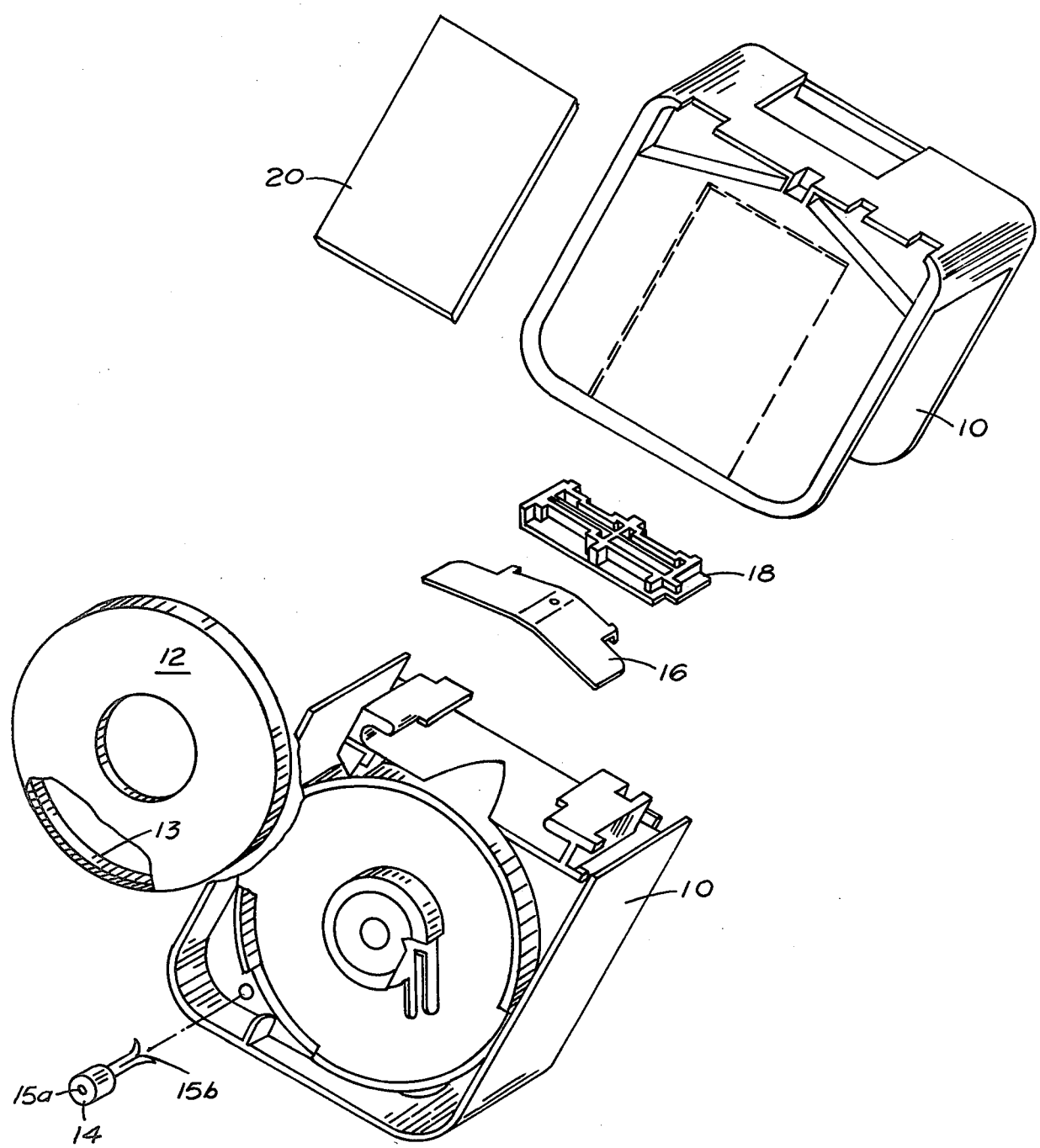
FIG. 1 is an exploded perspective view of a film cartridge referred to above.
Figure 2:
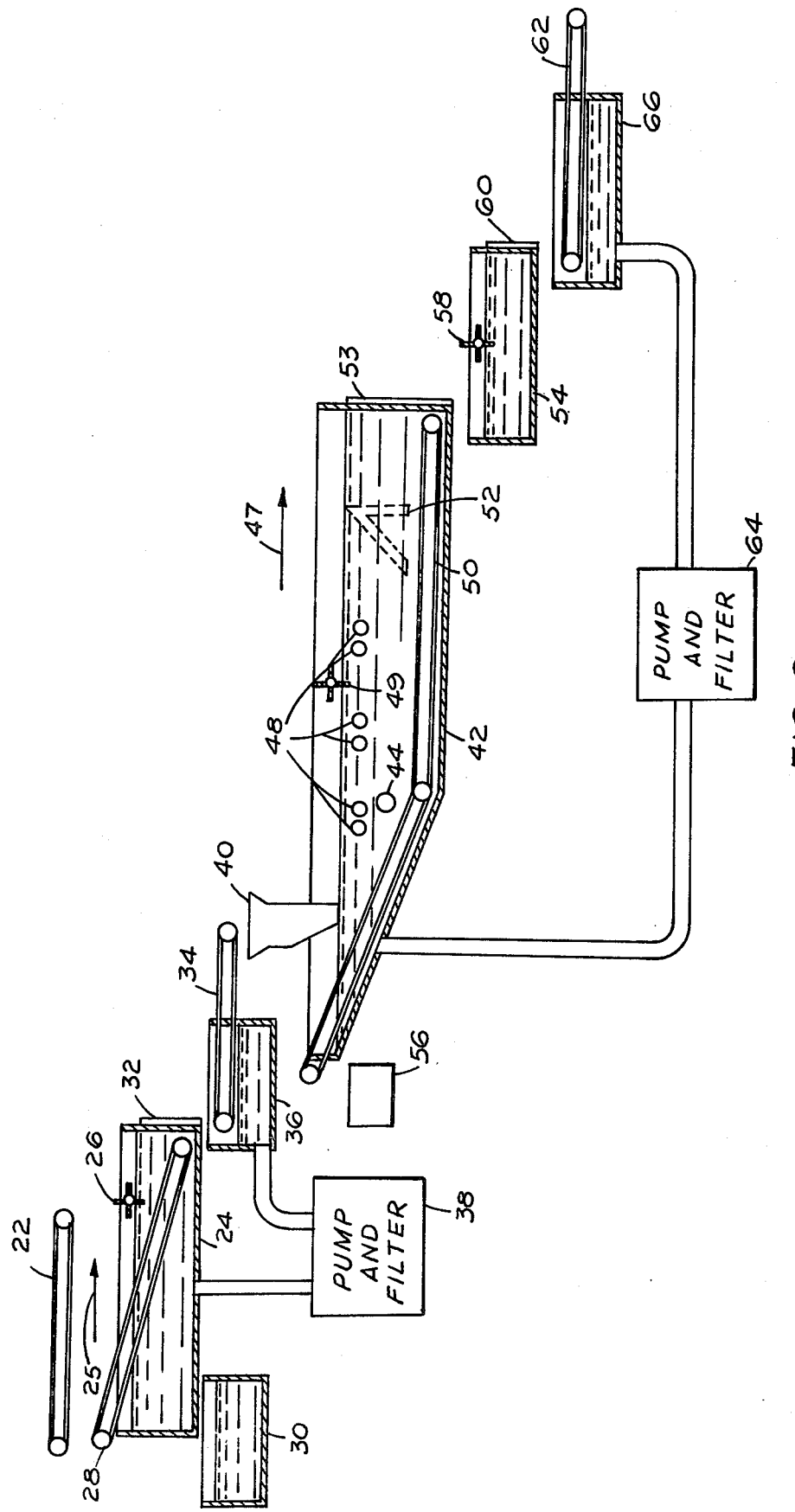
FIG. 2 is a side elevational view in section of separation apparatus in accordance with the present invention.

Referring now to FIG. 2, an embodiment of the invention is shown for separating component parts of a film cartridge. For this particular example, it is desired to separate polystyrene components of the film cartridge from polycarbonate, metal and butyrate components (FIG. 1). The film cartridge is first rough chopped by a mechanical chopper (not shown) to physically separate the various components of the film cartridge. The chopped pieces of the film cartridges are fed to a conveyor 22 which deposits the "chop" in a first separation tank 24. The chop is carried downstream (in the direction of arrow 25) in a solution having a specific gravity of about 1.06. One such solution is an 8% potassium carbonate and water solution. Mild agitation provided by a rotating paddle wheel 26 drives the brass leaf springs 16 (specific gravity of 8.6) and polycarbonate pressure pads (specific gravity of 1.25) down to the bottom of the separator tank 24 where they settle on a conveyor belt 28. The conveyor belt 28 carries components thereon in the opposite direction of flow (i.e., opposite the direction of arrow 26) and is angled such that the discharge end is above the solution level and extends beyond the back end of the separation tank 24. The pressure pads 18 and leaf springs 16 travel up the conveyor belt 28 and are deposited into a static tank 30 containing a solution having a specific gravity of about 1.3. The brass springs 16 thus settle to the bottom of the tank 30 and the polycarbonate pressure pads 18 float, thereby enabling the pads 18 to be periodically skimmed from the top of the solution in the static tank 30.

Even though the polycarbonate disc elements 12 (specific gravity of 1.25) and the butyrate roller posts 14 (specific gravity of 1.2) have a higher specific gravity than the solution contained in the separation tank 24 (specific gravity of 1.06) these components do not sink to the bottom of the separator tank 24 as may be expected. The reason is the geometry of these components. The disc element 12 is flat and thin and tends, by nature of this geometry, to float; in addition, the disc element 12 has ridges 13 which tend to trap air thereby preventing the disc element 12 from sinking. The roller post 14 has an indentation 15a and slit 15b, both of which trap air causing the roller post 14 to float.

Thus, pieces of the polystyrene housings 10, the polycarbonate disc elements 12, the butyrate roller posts 14 and the label pieces 20 affixed to the housing pieces 10 all flow over a weir 32 and drop onto a screen conveyor 34. The solution from the first separator tank 24 drains from the cartridge components, through the screen conveyor 34 and into a sump 36 from which the solution is drained, filtered and recirculated into the first separator tank 24 by a pumping system 38. The screen conveyor 34 deposits the component parts thereon in a hopper 40 which directs the parts falling therethrough into a second separation tank 42.

The second separation tank 42 contains an alkaline detergent solution having a specific gravity of about 1.06, for example a solution of 3.8% Pensol detergent (Pensol is a product of the Pennwalt Corp., Philadelphia, Pa.) and water. The alkaline detergent solution is heated to a temperature of about 210 F. by steam passing through a pipe 44. The mixture of cartridge component parts travels downstream (in the direction of arrow 47) and past three pairs of perforated tubes 48 connected to a source of low pressure steam at 220 to 230 degrees Fahrenheit. The steam indroduced through tubes 48 cause the water to boil in their immediate vicinity thereby creating a very turbulent action in the detergent solution. A paddle wheel 49 further adds to the turbulent action. The cartridge components traveling downstream are rolled around, swirled and submerged as they pass each pair of tubes 48. Each piece of cartridge housing 10 with a label portion adhered thereto gets exposed to the boiling alkaline detergent solution. The adhesive is thus dissolved and the label portions are driven off the housing pieces 10 and sink to a conveyor 50 in the bottom of the second separation tank 42. The butyrate roller posts 14 and the polycarbonate disc elements 12 also are tossed around with sufficient force to release air pockets entrapped thereby. The butyrate roller posts 14 and about half of the polycarbonate disc elements sink to the conveyor 50. Not all of the disc elements 12 sink to the conveyor 50 because, due to their flat geometry, they sink slower than the roller posts 14 and do not have ample time to sink to the conveyor 50 before they reach a ramp 52.

As the remaining film cartridge components (the polystyrene cartridge housing pieces 10, about half of the polycarbonate disc elements 12, a few label pieces 20 and some roller posts 14) flow over the ramp 52, they enter a relatively calm portion of the second separator tank 42. In this calm portion, a majority of the remaining label pieces 20, the balance of the roller posts 14, and most of the disc elements 12 sink sufficiently so that they do not overflow a weir 53 into a third separation tank 54 with the polystyrene housing pieces 10. Instead these elements settle onto the conveyor 50. All components settling on the conveyor 50 are carried out of the back of the second separation tank 42 and deposited in a container 56.

The alkaline detergent solution flowing into the third separation tank contains only the polystyrene housing pieces 10, some polycarbonate disc elements 12 and possibly a few label pieces 20. A paddle wheel 58 once again agitates the remaining cartridge components precipitating out any remaining label pieces 20 and most of the remaining polycarbonate disc elements 12. Over a final weir 60 flows the detergent solution containing clean, label and adhesive free, polystyrene housing pieces, to a screen conveyor 62 which transports the reclaimed polystyrene for rinsing and drying. A second pumping system 64 filters and recirculates the alkaline detergent solution from a sump 66 back to the second separation tank 42 to sustain solution flow. The reclaimed polystyrene pieces from conveyor 62 are passed through a blower (not shown) to blow away any of the polycarbonate disc elements 12 which may not have previously been eliminated.

The invention has been described in detail with particular reference to preferred embodiments thereof, but it will be understood that variations and modifications can be effected within the spirit and scope of the invention. For example, while the above discussion assumed a film cartridge from which polystyrene material was to be reclaimed, other types of materials may be reclaimed as well by a straightforward change in the specific gravity of the various solutions in the separation tanks. Polystyrene was merely chosen as a convenient example. Also, other means may be provided for causing the solution to boil such as electric heating elements.

What is claimed:

1. In a method for separating materials of different specific gravities wherein the materials are added to a tank containing a fluid of predetermined specific gravity so that materials having specific gravities higher than or lower than said predetermined specific gravity sink or float respectively, the improvement wherein said fluid is boiled in a localized region within said tank to produce a turbulent region of fluid in which materials are physically separated even though they tend to cling together and in which air entrapped by said materials is removed, thereby enabling the materials to be separated on the basis of their specific gravities in a less turbulent region of said tank.

2. A method for separating materials having different specific gravities wherein at least some of said materials are of a geometry that causes them to tend to float, and wherein at least some of said materials are affixed together by an adhesive, said method comprising the steps of:
    adding the materials to a tank containing a detergent fluid of predetermined specific gravity that is capable of dissolving said adhesive, said tank including a ramp member disposed within said tank so as to be submerged beneath said detergent fluid; and
    boiling said detergent fluid in a localized region within said tank to produce a turbulent region of fluid in said tank separated by said ramp member from a relatively calm region of fluid,
    whereby said turbulence facilitates sinking of those materials having a higher specific gravity than said detergent fluid but which are of a geometry that causes them to tend to float, said detergent fluid dissolves said adhesive permitting affixed materials to be separated, and said calm region of fluid further facilitates separation of said materials on the basis of specific gravity.

3. A method as claimed in claim 2 further comprising the step of submerging floating materials in said tank, including materials having a geometry that causes them to float.

4. A method for reclaiming plastic material from an article having a label affixed thereto by an adhesive, said article including plastic material and other materials having a higher specific gravity than said plastic material, some of which materials having a geometry that causes them to float in a fluid of higher specific gravity, said method comprising the steps of:
    separating the article into pieces to at least partially separate the component materials;
    adding said component materials to a first separation tank containing a fluid having a lower specific gravity than said plastic material to at least partially separate said other materials from said plastic material;
    adding said materials from said first separation tank to a second separation tank containing a detergent fluid capable of dissolving said adhesive and having a specific gravity lower than said plastic material, said second separation tank including a ramp member disposed within said second separation tank so as to be submerged by said detergent fluid;
    boiling said detergent fluid in a localized region within said tank to produce a turbulent region of fluid in said tank separated by said ramp member from a relatively calm region of fluid,
    whereby said turbulence facilitates sinking of those materials having a higher specific gravity than said detergent fluid but which are of a geometry that causes them to tend to float, said detergent fluid dissolves said adhesive permitting affixed materials to be separated, and said calm region of fluid further facilitates separation of said materials on the basis of specific gravity.

5. A method as claimed in claim 4 further comprising the step of adding said materials from said second separation tank to a third separation tank containing detergent fluid to provide final separation of said plastic material from said other materials.

6. A method as claimed in claim 5 further comprising the step of submerging floating materials in said first, second and third separation tanks respectively.

7. A method as claimed in claim 4 further comprising the step of submerging floating materials in said first and second separation tanks respectively.

8. A method for separating component materials of an article, the article being comprised of heavier and lighter materials having first and second specific gravities respectively, said method comprising the steps of:
    separating the article into pieces to at least partially separate the heavier and lighter materials;
    heating a fluid having a specific gravity between the first and second specific gravities to its boiling temperature in a localized region, thereby resulting in a turbulent region of the fluid and a less turbulent region of the fluid; and
    adding the pieces of the article to the fluid for further separation in the turbulent region of the fluid, the separated pieces of the heavier and lighter materials sinking and floating respectively in the less turbulent region of the fluid.

9. A method for separating component materials of an article, the article comprised of heavier and lighter materials of first and second specific gravities respectively, at least some of said heavier and lighter materials being affixed together by an adhesive, said method comprising the steps of:
    separating the article into pieces to at least partially separate the heavier and lighter materials;
    heating a detergent solution having a specific gravity between the first and second specific gravities to its boiling temperature only in a localized region, thereby resulting in a turbulent region of the detergent solution and a less turbulent region of the detergent solution; and
    adding the pieces of the article to the detergent solution for further separation under the influence of the turbulent action of the boiling detergent solution, the separated pieces of the heavier material sinking, and the separated pieces of the lighter material floating, in the less turbulent region of the detergent solution.

10. A method for removing a label affixed to an article by an adhesive, said article and said label having first and second specific gravities respectively, said method comprising the steps of:
    heating a detergent solution having a specific gravity between the first and second specific gravities to its boiling temperature only in a localized region, thereby resulting in a turbulent region of the detergent solution and a less turbulent region of the detergent solution; and
    adding the article to the detergent solution to remove the label therefrom under the influence of the turbulent action of the boiling detergent solution, the heavier of the article and label sinking, the lighter of the article and label floating, in the less turbulent region of the detergent solution.

* * * * *